United States Patent
Lin

(10) Patent No.: US 10,721,076 B2
(45) Date of Patent: Jul. 21, 2020

(54) METHOD, DEVICE, TERMINAL, AND SERVER FOR A SECURITY CHECK

(71) Applicant: ALIBABA GROUP HOLDING LIMITED, George Town, Grand Cayman (KY)

(72) Inventor: Junsui Lin, Zhejiang (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 129 days.

(21) Appl. No.: 15/484,061

(22) Filed: Apr. 10, 2017

(65) Prior Publication Data

US 2017/0222813 A1 Aug. 3, 2017

Related U.S. Application Data

(63) Continuation of application No. PCT/CN2015/091235, filed on Sep. 30, 2015.

(30) Foreign Application Priority Data

Oct. 10, 2014 (CN) .......................... 2014 1 0532781

(51) Int. Cl.
*H04L 9/32* (2006.01)
*H04W 12/02* (2009.01)
(Continued)

(52) U.S. Cl.
CPC .......... *H04L 9/3247* (2013.01); *H04L 9/0819* (2013.01); *H04L 9/0869* (2013.01);
(Continued)

(58) Field of Classification Search
CPC .... H04L 9/3247; H04L 9/0819; H04W 12/06; G06F 21/32
See application file for complete search history.

(56) References Cited

U.S. PATENT DOCUMENTS

| 6,920,561 B1 | 7/2005 | Gould et al. |
| 2005/0050327 A1 | 3/2005 | Okamoto |

(Continued)

FOREIGN PATENT DOCUMENTS

| CN | 1808974 | 7/2006 |
| CN | 104008351 A | 8/2014 |

(Continued)

OTHER PUBLICATIONS

First Chinese Office Action issued in Chinese Application No. 201410532781.9. dated Jan. 2, 2018, 20 pages.
(Continued)

*Primary Examiner* — Matthew T Henning
(74) *Attorney, Agent, or Firm* — Finnegan, Henderson, Farabow, Garrett & Dunner, LLP

(57) ABSTRACT

A method, a device, a terminal, and a service are described for a security check for terminal users. The method may include: performing a local check via an updated check mode to acquire a local check result, when a terminal user performs the security check; encrypting the local check result according to stored substitutive credential information to acquire an encrypted check result, wherein the substitutive credential information is generated when the updated check mode is used to replace an original check mode; and sending the encrypted check result, the local check result and user information of the terminal user to a server, so that the server determines that the local check result is trustable when the verification of the encrypted check result according to substitutive credential information corresponding to the user information is passed.

23 Claims, 10 Drawing Sheets

(51) Int. Cl.
  *H04W 12/06* (2009.01)
  *H04L 29/06* (2006.01)
  *H04L 9/08* (2006.01)
  *H04L 9/14* (2006.01)
  *H04L 9/30* (2006.01)
  *G06F 21/32* (2013.01)

(52) U.S. Cl.
  CPC .............. *H04L 9/0894* (2013.01); *H04L 9/14* (2013.01); *H04L 9/30* (2013.01); *H04L 9/32* (2013.01); *H04L 63/0428* (2013.01); *H04L 63/0807* (2013.01); *H04W 12/02* (2013.01); *H04W 12/06* (2013.01); *G06F 21/32* (2013.01); *H04L 2209/80* (2013.01)

(56) References Cited

U.S. PATENT DOCUMENTS

| | | | |
|---|---|---|---|
| 2005/0086298 A1* | 4/2005 | Campbell | G06Q 30/04 709/203 |
| 2012/0131350 A1 | 5/2012 | Atherton | |
| 2012/0311340 A1 | 12/2012 | Naganuma et al. | |
| 2013/0191884 A1 | 7/2013 | Leicher et al. | |
| 2015/0046707 A1* | 2/2015 | Atherton | H04L 9/3231 713/168 |

FOREIGN PATENT DOCUMENTS

| | | |
|---|---|---|
| CN | 104022879 A | 9/2014 |
| JP | 2005080065 A | 3/2005 |
| JP | 2006197127 A | 7/2006 |
| JP | 2007220075 A | 8/2007 |
| JP | 2011059749 A | 3/2011 |
| JP | 2011176435 A | 9/2011 |
| KR | 1020140114058 | 8/2014 |
| WO | WO 2008/099756 A1 | 5/2010 |
| WO | WO 2011/105350 A1 | 6/2013 |
| WO | WO 2013/134832 A1 | 9/2013 |
| WO | WO 2016/054990 A1 | 4/2016 |

OTHER PUBLICATIONS

Second Chinese Office Action issued in Chinese Application No. 201410532781.9, dated Sep. 4, 2018, 7 pages.
PCT International Search Report and Written Opinion dated Jan. 5, 2016, issued in corresponding International Application No. PCT/CN2015/091235 (13 pages).
Extended European Search Report pursuant to Rule 62 EPC, the Supplementary European Search Report (Art. 153(7) EPC) and the European Search Opinion issued in EPO Application No. 15848953.4 dated Aug. 24, 2017 (8 pages).
Sakimura et al., "OpenID Connect Core 1.0—draft 21 incorporating errata set 1," retrieved from the internet: http://openid.net/specs/openid-connect-core-1_0-21.html, 94 pages (2014).
Korean Office Action issued in Korean Application No. 10-2017-7012520, dated Jul. 10, 2019, 9 pages.
Japanese Office Action issued in Japanese Application No. 2017-518082, dated Jul. 22, 2019, 14 pages.
Search Report by Registered Search Organization by Industrial Property Cooperation Center in Japan in corresponding to Japanese Application No. 2017-518082, dated Jun. 28, 2019, 48 pages.

* cited by examiner

US 10,721,076 B2

METHOD, DEVICE, TERMINAL, AND SERVER FOR A SECURITY CHECK

CROSS REFERENCE TO RELATED APPLICATION

The disclosure claims the benefits of priority to International Application No. PCT/CN2015/091235, filed on Sep. 30, 2015, which claims the benefits of priority to Chinese Application No. 201410532781.9, filed on Oct. 10, 2014, both of which are incorporated herein by reference in their entireties.

TECHNICAL FIELD

The disclosure relates to a field of communication technologies, and in particular, to a method, a device, a terminal, and a server for a security check.

BACKGROUND

With the development of smart terminals and network applications, a user may access various network applications via various client applications installed on a terminal. During the access, the user generally needs to perform identity authentication, membership registration, network transaction, or the like. In the meanwhile, an application server may verify the user identity. The traditional mode for verification is an application server check. That is, a user sends a pre-set check password to an application server via a terminal, and when the application server verifies that the check password is consistent with a password at the time of user registration, the check is passed. The check password in the above check mode, however, may be easily stolen by a malicious third party through a Trojan program. Therefore, generally, during check, a terminal local check may be an alternative of the application server check. For example, based on check prompting information sent by the application server or the terminal itself, the terminal locally performs user-biometric-based fingerprint check, dynamic-identifying-based gesture check, or the like, so as to complete user identity check and send a check result to the server.

Problems can occur when a malicious third party simulates the terminal to interact with the server for sending a forged terminal local check to the server. For example, when the terminal local check is used to replace the application server check, the server cannot determine the trustworthiness of the terminal local check mode, which serves as a substitute check mode. Under such scenarios, the lack of trustworthiness makes the reliability of the existing security check mode poor and the access security of network applications low.

SUMMARY

Embodiments of the disclosure provide a method, a device, a terminal and a server for a security check, so as to address the problem of poor reliability of a security check mode in conventional technologies.

A first aspect of the disclosure provides a security check method, comprising: performing a local check via an updated check mode to acquire a local check result, when a terminal user performs the security check; encrypting the local check result according to stored substitutive credential information to acquire an encrypted check result, wherein the substitutive credential information is generated when the updated check mode is used to replace an original check mode; and sending the encrypted check result, the local check result and user information of the terminal user to a server, so that the server determines that the local check result is trustable when verification of the encrypted check result according to substitutive credential information corresponding to the user information is passed.

A second aspect of the disclosure further provides a security check method, comprising: receiving an encrypted check result, a local check result, and user information of a terminal user that are sent by a terminal, wherein the encrypted check result is generated when the terminal encrypts the local check result according to stored substitutive credential information, the substitutive credential information is generated when the terminal uses an updated check mode to replace an original check mode, and the local check result is acquired by the terminal performing a local check via the updated check mode when the terminal user performs a security check; acquiring substitutive credential information corresponding to the user information; and verifying the encrypted check result according to the substitutive credential information corresponding to the user information, and determining the local check result to be trustable when the verification is passed.

A third aspect of the disclosure further provides a security check device, comprising: a checking unit used for performing a local check via an updated check mode to acquire a local check result when a terminal user performs a security check; an encrypting unit used for encrypting the local check result according to stored substitutive credential information to acquire an encrypted check result, wherein the substitutive credential information is generated when the updated check mode is used to replace an original check mode; and a first sending unit used for sending the encrypted check result, the local check result, and user information of the terminal user to a server, so that the server determines the local check result to be trustable when the verification of the encrypted check result according to second substitutive credential information corresponding to the user information is passed.

A fourth aspect of the disclosure further provides a security check device, comprising: a first receiving unit used for receiving an encrypted check result, a local check result, and user information of a terminal user that are sent by a terminal, wherein the encrypted check result is generated when the terminal encrypts the local check result according to stored substitutive credential information, the substitutive credential information is generated when the terminal uses an updated check mode to replace an original check mode, and the local check result is acquired by the terminal performing a local check via the updated check mode when the terminal user performs a security check; an acquiring unit used for acquiring substitutive credential information corresponding to the user information; and a checking unit used for verifying the encrypted check result according to the substitutive credential information corresponding to the user information, and determining the local check result to be trustable when the verification is passed.

A fifth aspect of the disclosure further provides a terminal, comprising a processor; a memory, storing instruction executable by the processor; wherein, the processor is configured to: perform a local check via an updated check mode to acquire a local check result, when a terminal user performs the security check; encrypt the local check result according to stored substitutive credential information to acquire an encrypted check result, wherein the substitutive credential information is generated when the updated check mode is used to replace an original check mode; and send the encrypted check result, the local check result and user information of the terminal user to a server, so that the server determines that the local check result is trustable when the verification of the encrypted check result according to substitutive credential information corresponding to the user information is passed.

A sixth aspect of the disclosure provides a server, comprising a processor; and a memory for storing instructions executable by the processor; wherein the processor is configured to: receive an encrypted check result, a local check result, and user information of a terminal user that are sent by a terminal, wherein the encrypted check result is generated when the terminal encrypts the local check result according to stored substitutive credential information, the substitutive credential information is generated when the terminal uses an updated check mode to replace an original check mode, and the local check result is acquired by the terminal performing a local check via the updated check mode when the terminal user performs a security check; acquire substitutive credential information corresponding to the user information; and verify the encrypted check result according to the substitutive credential information corresponding to the user information, and determine the local check result to be trustable when the verification is passed.

BRIEF DESCRIPTION OF THE DRAWINGS

The drawings herein are provided, as a part of the disclosure, for further understanding of the disclosure. Illustrative embodiments of the disclosure and description thereof are used to explain the disclosure, and are not restrictive. In the drawings.

DETAILED DESCRIPTION

Exemplary embodiments are described in detail herein, and examples of the embodiments are shown in the accompanying drawings. When the accompanying drawings are described below, unless specified otherwise, same numerals in different drawings indicate same or similar elements. Implementations described in the following exemplary embodiments do not represent all implementations consistent with the present disclosure. On the contrary, they are only examples of devices and methods consistent with some aspects described in detail in claims, of the present disclosure.

The terms used in the present disclosure are merely for the purpose of describing specific embodiments, rather than limiting the present disclosure. Singular forms, such as "a", "said", and "the", used in the present disclosure and the claims are also intended to include plural forms, unless clearly specified otherwise in the context. It should also be understood that the term "and/or" used herein indicates and includes any or all possible combinations of one or more associated listed items.

It should be understood that, although terms "first", "second", "third", and the like may be used in the present disclosure to describe various elements, the elements are not limited by the terms. These terms are used merely to differentiate elements of a same type. For example, without departing from the scope of the present disclosure, a first element may also be referred to as a second element. Similarly, the second element may also be referred to as the first element. According to the context, as used herein, the word "if" may be construed as "at the time of" or "when" or "in response to determining".

Figure 1:
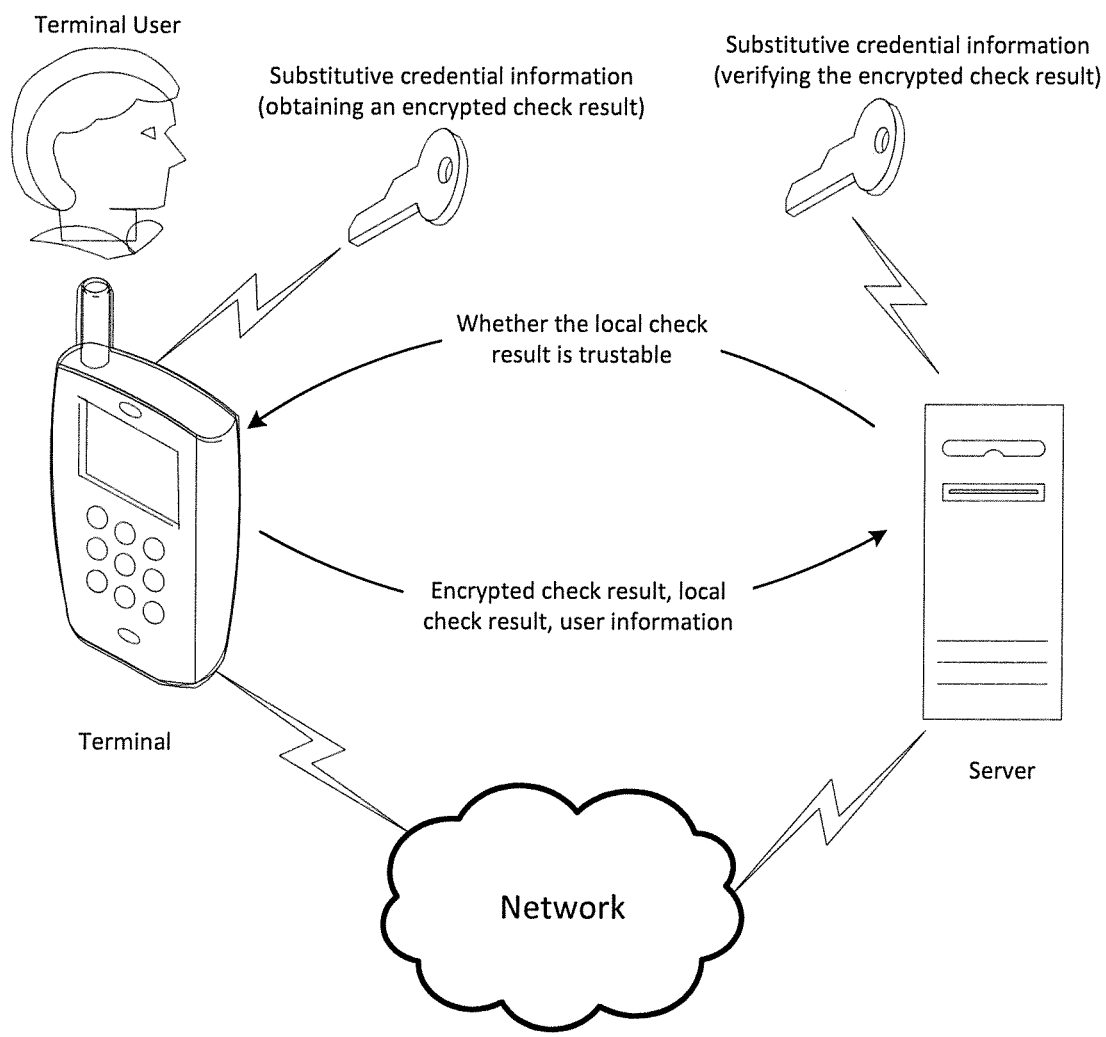
FIG. 1 is a schematic diagram of a security check scenario according to embodiments of the disclosure.

In a scenario for Internet-based communication, a user may access various network applications via various client applications installed on a terminal held by the user. During the access, the user generally needs to perform identity authentication, membership registration, network transaction, or the like. To secure the above access, a server performs a security check on the user identity. These types of server-end check modes are gradually being replaced with terminal local check modes. However, because a malicious third party may easily forge a terminal local check result and interact with the server during the replacing, the reliability of the security check is deteriorated. With reference to FIG. 1, which is a schematic diagram of an application scenario for implementing security check according to the embodiments of the disclosure, all check between a terminal and a server are performed based on the Internet. When an original check mode is replaced with an updated check mode both the terminal and the server store the substitutive credential information generated for the updated check mode. When the updated check mode is used for checking, a local check result may be encrypted according to substitutive credential information. The corresponding server may verify, according to the substitutive credential information, the encrypted check result transmitted by the terminal. And the local check result may be further determined to be reliable when the verification is passed, so as to improve the reliability of the security check and secure the access of network applications. Embodiments of the present disclosure are described in detail as below.

Figure 2A:
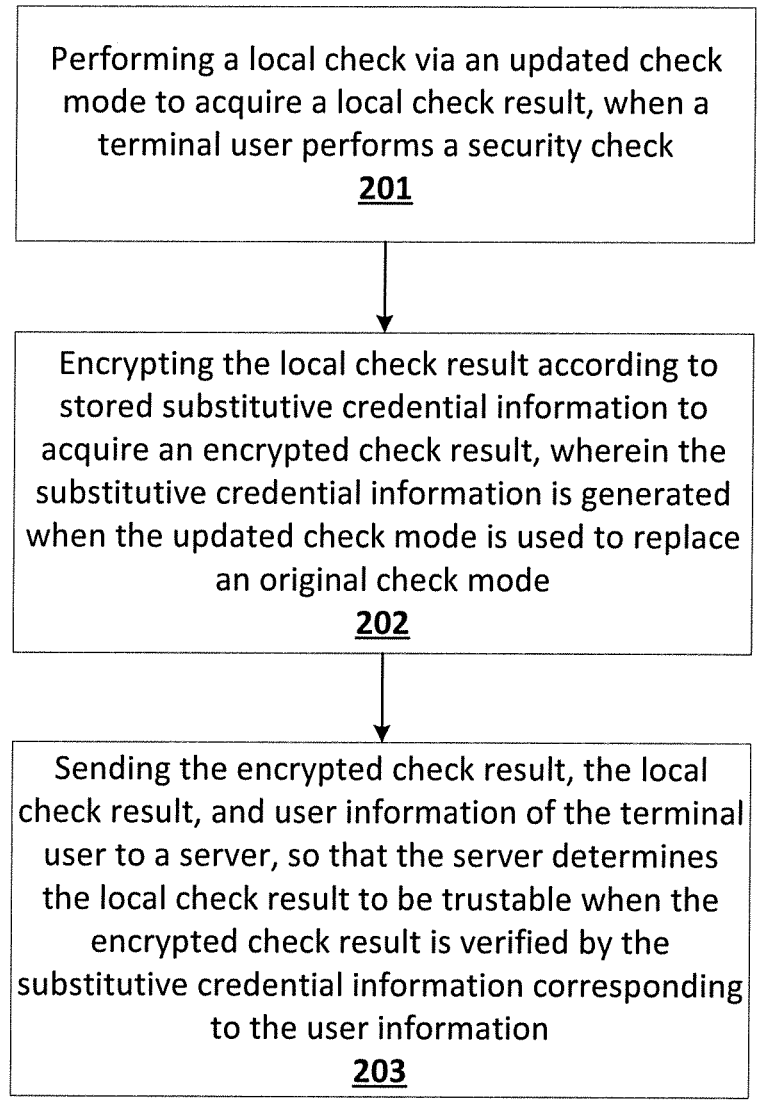
FIG. 2A is a flow chart of a security check method according to embodiments of the disclosure.

FIG. 2A is a flow chart of a security check method according to embodiments of the disclosure. The embodiments of the method describe from a terminal side where the security check is performed. The method includes steps 201-203.

In step 201, when a terminal user performs a security check, a local check is performed via an updated check mode to acquire a local check result.

For example, a mode for a security check being performed at a server side may be referred to as an original check mode, and the original check mode usually includes a server performing a check by a check password stored at the time of terminal user registration. A mode for a security check being locally performed at a terminal may be referred to as an updated check mode. The updated check mode may include a fingerprint check mode, a gesture check mode, a face pose check mode, or the like.

For example, when the updated check mode is used to replace the original check mode, the terminal may acquire first original check credential information regarding the original check mode, wherein the first original check credential information may be a check password set at the time of terminal user registration. The terminal generates substitutive credential information for the updated check mode, and sends the first original check credential information, the substitutive credential information, and user information of the terminal user to the server. The substitutive credential information may be a key or a random string, while the user information may be a user name of the terminal user and may further include a terminal identifier of the terminal. The terminal user may be uniquely identified by the user information. In the meanwhile, the terminal may locally store the generated substitutive credential information. For example, the substitutive credential information may be stored in a Trusted Execution Environment (TEE) module or a Security Environment (SE) module. After receiving the first original check credential information, the substitutive credential information and the user information of the terminal user, the server may search for second original check credential information corresponding to the user information. The second original check credential information may be a check password that is set by the terminal user at the time of terminal user registration and is sent by the terminal to the server. The server may store the correlation between the substitutive credential information and the user information when the second original check credential information is consistent with the first original check credential information after being compared.

The terminal may perform a local check according to the updated check mode to acquire a local check result when the terminal user performs the security check. When the updated check mode is used to perform the local check, the server may usually send check prompting information to the terminal, and the terminal acquires the local check result, for example, in real time according to the check prompting information.

In step 202, the local check result is encrypted according to stored substitutive credential information to acquire an encrypted check result, wherein the substitutive credential information is the information generated when the updated check mode is used to replace an original check mode.

For example, the terminal may acquire, after acquiring the local check result, the substitutive credential information that has been stored and is generated for the updated check mode, and encrypt the local check result according to the substitutive credential information to acquire an encrypted check result. According to different types of substitutive credential information, different encryption modes may be applied. Embodiments shown in FIG. 3 and FIG. 4 will provide detailed description taking a key and a random string as examples respectively, and details are omitted herein.

In step 203, the encrypted check result, the local check result, and user information of the terminal user are sent to a server. Using this information, the server can determine that the local check result is trustworthy when the encrypted check result is verified by the substitutive credential information corresponding to the user information.

It may be seen from the above embodiments that, during replacing the original check mode by the updated check mode, both the terminal and the server store the substitutive credential information generated for the updated check mode. Therefore, when the updated check mode is used for a check, the local check result may be encrypted according to the substitutive credential information. And the corresponding server may verify, according to the substitutive credential information, the encrypted check result that has been encrypted and is transmitted by the terminal, and then determine the local check result to be trustable when the verification is passed. By applying embodiments of the disclosure, a malicious third party cannot acquire the substitutive credential information, and the security check cannot be completed even if the malicious third party acquires the local check result. Therefore the embodiments of the method may improve the reliability of the security check and secure the access of network applications.

Figure 2B:
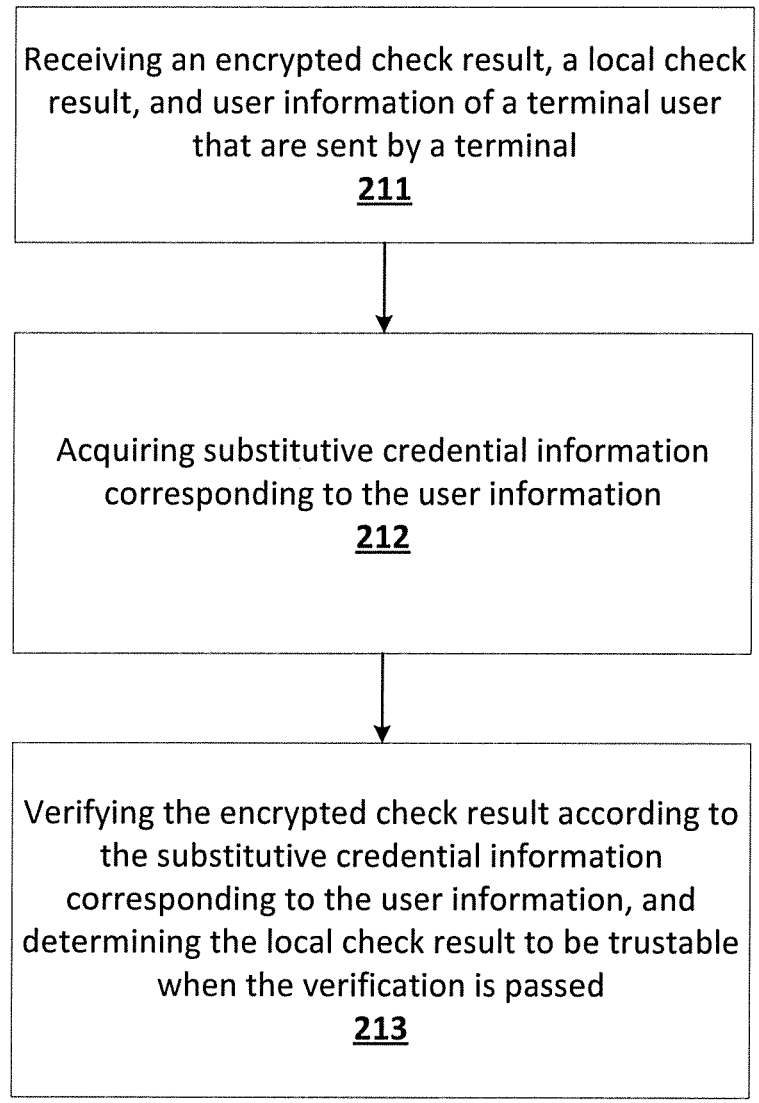
FIG. 2B is a flow chart of a security check method according to embodiments of the disclosure.

FIG. 2B is a flow chart of another security check method according to embodiments of the disclosure, and this method describes how to implement a security check from a server side. The method includes steps 211-213.

In step 211, an encrypted check result, a local check result, and user information of a terminal user that are sent by a terminal may be received.

Referring to the description in earlier step 201, when an updated check mode is used to replace an original check mode, the terminal may acquire first original check credential information of the original check mode, generate substitutive credential information for the updated check mode, and send to a server the first original check credential information, the substitutive credential information, and the user information of the terminal user. After receiving the first original check credential information, the substitutive credential information and the user information of the terminal user, the server may search for second original check credential information corresponding to the user information. Based on the search, the server may store the correlation between the substitutive credential information and the user information when the second original check credential information is consistent with the first original check credential information after being compared.

When the terminal user performs a security check, the terminal sends to the server, the local check result that is acquired according to the updated check mode, the encrypted check result that is generated by encrypting the local check result according to stored substitutive credential information, and the user information of the terminal user.

In step 212, substitutive credential information corresponding to the user information is acquired.

For example, after receiving the encrypted check result, the local check result, and the user information of the terminal user, the server may search for the correlation between the stored substitutive credential information and the user information. And the server may acquire the substitutive credential information corresponding to the user information.

In step 213, the encrypted check result is verified according to the substitutive credential information corresponding to the user information, and the local check result is determined to be trustable when the verification is passed.

Figure 3:
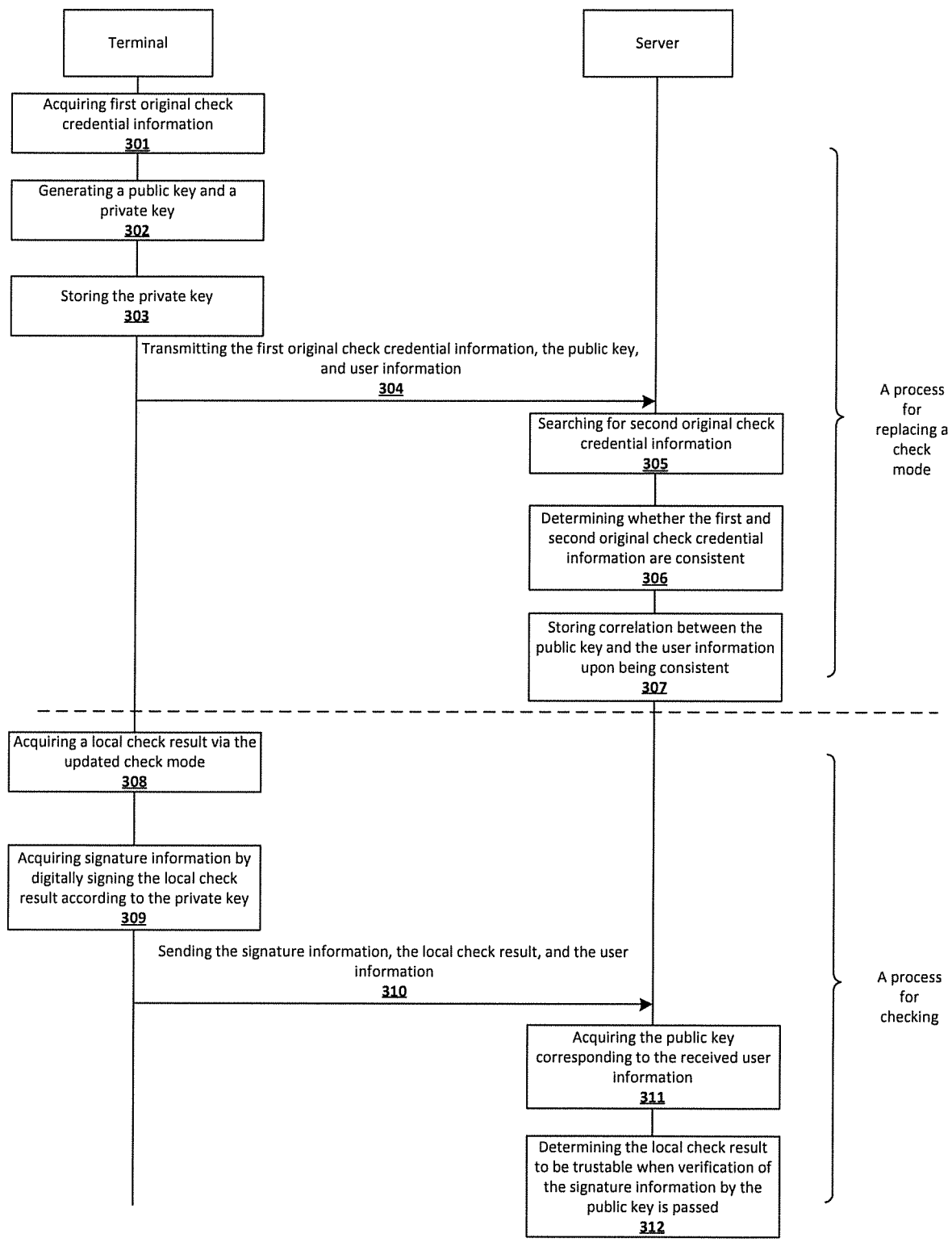
FIG. 3 is a flow chart of another security check method according to embodiments of the disclosure.
Figure 4:
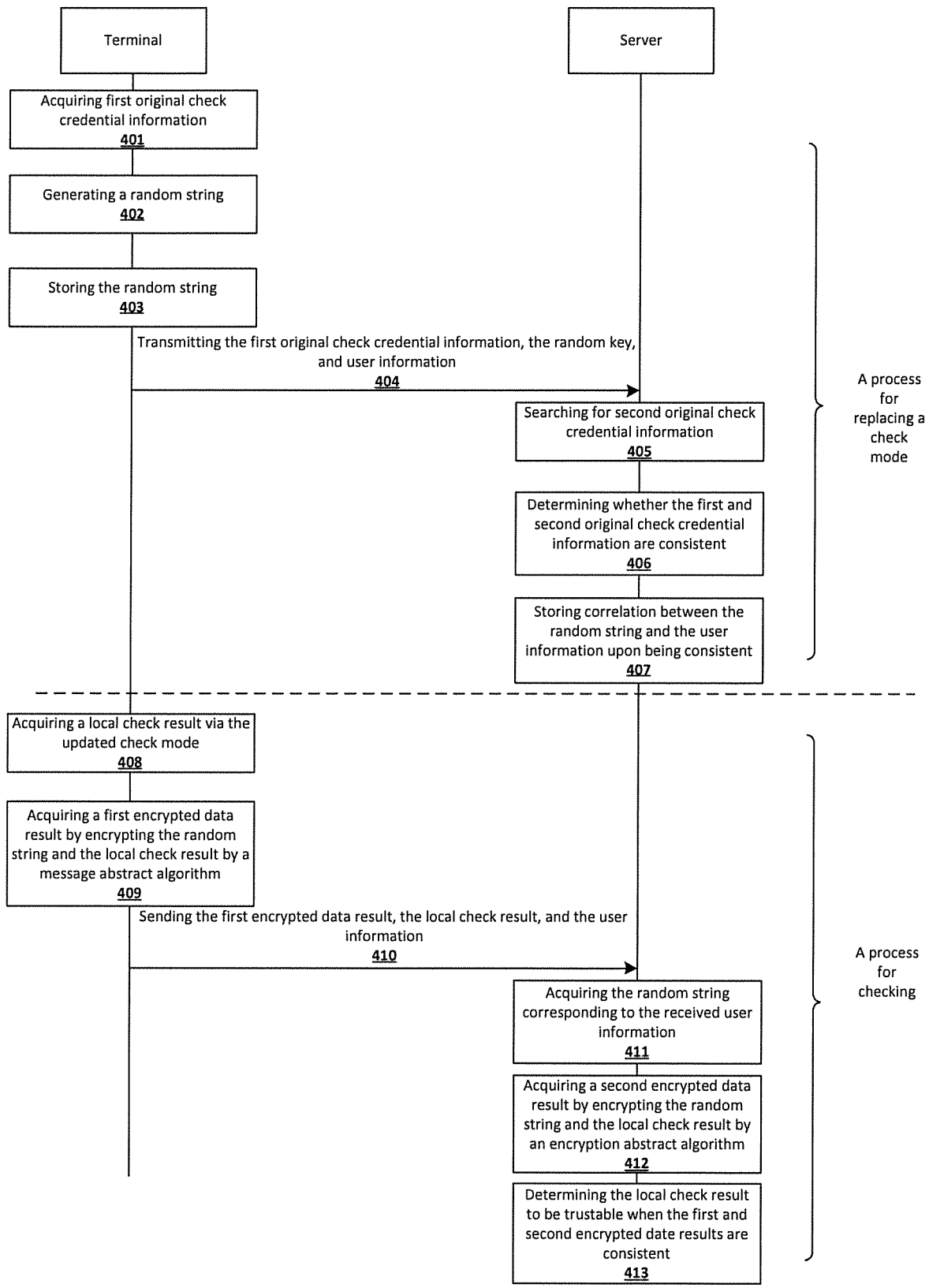
FIG. 4 is a flow chart of another security check method according to embodiments of the disclosure.

For example, when the server verifies the encrypted check result according to the substitutive credential information, according to different types of substitutive credential information, different verification modes may be used, and the embodiments shown in subsequent FIG. 3 and FIG. 4 will provide detailed description taking a key and a random string as examples respectively, and details are omitted herein. When the verification of the encrypted check result is passed, the server may determine the local check result sent by the terminal to be a trusted check result.

It may be seen from the above embodiments that, during replacing the original check mode with the updated check mode, both the terminal and the server store the substitutive credential information generated for the updated check mode. Therefore, when the updated check mode is used for a check, the local check result may be encrypted according to the substitutive credential information. And the corresponding server may verify, according to the substitutive credential information, the encrypted check result transmitted by the terminal. When the verification is passed, the server determines that the local check result is trustworthy. In the application of the embodiments of the disclosure, a malicious third party cannot acquire the substitutive credential information, and the security check cannot be completed even if the malicious third party acquires the local check result. And therefore this embodiment may improve the reliability of the security check and secure the access of network applications.

FIG. 3 is a flow chart of another security check method according to some embodiments of the disclosure. The embodiments take the substitutive credential information being a public key and a private key as an example, to describe in detail the process of a security check from the perspective of interaction between a terminal and a server. The method may include steps 301-312.

In step 301, the terminal acquires first original check credential information of the original check mode when the updated check mode is used to replace the original check mode.

For example, a mode of security check being performed at a server side may be referred to as an original check mode, and the original check mode is usually a server performing a check using a check password stored at the time of terminal user registration. A mode of security check being locally performed at a terminal may be referred to as an updated check mode, and the updated check mode may include a fingerprint check mode, a gesture check mode, a face pose check mode, or the like.

In some embodiments, when the updated check mode is used to replace the original check mode, the terminal may acquire first original check credential information of the original check mode. The first original check credential information may be a check password set at the time of terminal user registration. When the original check mode is used for a security check, the terminal user inputs, on a security check interface of the terminal, a user name and a check password set at the time of registration. The terminal may carry the user name and the check password in a security check request, and send the security check request to the server. The server searches for a check password corresponding to the user name stored in user registration information, and may determine that the terminal user has passed the security check if the retrieved check password is the same as the check password sent by the terminal, so that service operations executed by the terminal user may be released.

In step 302, the terminal generates a public key and a private key for the updated check mode.

For example, when it is determined to use the updated check mode to replace the original check mode, the terminal may generate, for the updated check mode, a key that serves as the substitutive credential information, including a public key and a private key. Any key generating algorithm may be used for generating the key, and description of the algorithm is omitted herein.

In step 303, the terminal stores the private key in a trusted storage area associated with the terminal user.

For example, the trusted storage area may include a TEE module or an SE module. After the public key and the private key are generated, the terminal may store the private key in the trusted storage area.

In step 304, the terminal transmits the first original check credential information, the public key, and the user information of the terminal user to the server.

In some embodiments, the user information may be a user name of the terminal user (e.g., a user name set at the time of terminal user registration). The user information may further include a terminal identifier of the terminal (e.g., a Media Access Control (MAC) address of the terminal). The terminal user may be uniquely identified according to the user information. The terminal further transmits the acquired first original check credential information, the generated public key, and the user information of the terminal user to the server, so that the server may verify the first original check credential information.

In step 305, the server searches for second original check credential information corresponding to the user information.

With regard to all the terminal users that have registered on the server, the server stores the correlations between user information of these terminal users and check passwords, wherein the check password is check credential information. In some embodiments, upon receiving the first original check credential information, the public key, and the user information of the terminal user transmitted by the terminal, the server may search for the correlation between the user information and the check password and acquire a check password corresponding to the received user information. The check password is referred to as the second original check credential information in embodiments.

In step 306, the server determines whether the first original check credential information is consistent with the second original check credential information.

For example, the server determines whether the received first original check credential information is consistent with the found second original check credential information. That is, whether the check password of the terminal user stored by the server is the same as the check password transmitted by the terminal may be determined, so that whether an object that is currently replacing a security check mode is the terminal user himself/herself may be further determined.

In step 307, the server stores the correlation between the public key and the user information, when the first original check credential information is consistent with the second original check credential information.

When the first original check credential information is determined to be consistent with the second original check credential information according to a comparison result, the server may determine that the object that is currently replacing a security check mode is the terminal user himself/herself. Then the server may store the correlation between the received public key and the user information.

In step 308, the terminal performs a local check via the updated check mode to acquire a local check result when the terminal user performs a security check.

The terminal may perform a local check via the updated check mode to acquire a local check result when the terminal user performs a security check. When the updated check mode is used for a local check, check prompting information is generally sent to the terminal by the server, and the terminal acquires a local check result according to the check prompting information. For example, when the updated check mode is a gesture check mode, assuming that gesture check prompting information returned by the server to the terminal is "2", then the terminal user may show two fingers according to the gesture check prompting information. After the two fingers is recognized by an image recognition processing technology, the terminal takes a recognition result of "2" as a local check result.

In step 309, the terminal digitally signs the local check result according to the private key stored in the trusted storage area to acquire signature information.

For example, after acquiring the local check result, the terminal may acquire the stored private key from the trusted storage area, and use the private key to digitally sign the local check result. The digital signature technique is an encryption technique, by which abstract information may be encrypted by a private key of a sender and sent, together with an original text, to a receiver. The receiver may decrypt the encrypted abstract information by a public key of the sender, and then generate abstract information of the received original text by a HASH function, and compare the generated abstract information with the decrypted abstract information. If the generated abstract information and the decrypted abstract information are the same, it is indicated that the received information is not modified, and therefore the information integrity may be verified by a digital signature. For the specific process of digitally signing the local check result in the embodiments, reference may be made to the implementation process of the existing digital signature technique, and details are omitted herein.

In step 310, the terminal sends the signature information, the local check result, and the user information of the terminal user to the server.

In step 311, the server acquires a public key corresponding to the received user information by searching for the stored correlation.

With reference back to step 307, when the updated check mode is used to replace the local check mode, the server stores the correlation between the public key and the user information. In this step, the server may search for the above-mentioned correlation after receiving the signature information, the local check result, and the user information of the terminal user, so as to acquire a public key corresponding to the received user information.

In step 312, the server verifies the received signature information by the retrieved public key, and determines the received local check result to be trustable when the verification is passed.

Corresponding to the digital signature process locally performed at the terminal in step 309, the verification of the signature information is a decryption process. During the verification of the signature information, the server may verify the signature information by the retrieved public key. The specific verification process is consistent with the existing digital signature technique, and details are omitted herein. When the verification is passed, the server may determine that the received local check result is a trusted check result.

Furthermore, the server may determine the accuracy of the check result. If the check result is accurate, current service operations of the terminal user may be released; if the check result is inaccurate, the terminal user is prohibited from executing the current service operations.

It may be seen from the above embodiments that, when the updated check mode is used to replace the original check mode, the terminal stores the private key generated for the updated check mode, and the server stores the public key generated for the updated check mode. Therefore, when the updated check mode is used for a check, the terminal may digitally sign the local check result by the private key. And the corresponding server may verify, via the public key, the signature information transmitted by the terminal; When the verification is passed, the server can then determine that the local check result is trustworthy. In the application of the embodiments of the present disclosure, a malicious third party cannot acquire the private key and the public key, and the security check cannot be completed even if the malicious third party acquires the local check result. Therefore this embodiment may improve the reliability of the security check and secure the access of network applications.

FIG. 4 is a flow chart of another security check method according to embodiments of the disclosure. The embodiments of the method take the substitutive credential information being a random string as an example, so as to describe in detail the process of a security check from the perspective of interaction between a terminal and a server. The method includes steps 401-413.

In step 401, the terminal acquires first original check credential information of the original check mode when the updated check mode is used to replace the original check mode.

The description of step 401 is consistent with that of step 301, and details are omitted herein.

In step 402, the terminal generates a random string for the updated check mode.

Different from generating a key as the substitutive credential information in FIG. 3, in the embodiment of FIG. 4, the terminal may generate for the updated check mode a random string that serves as the substitutive credential information after it has been determined to use the updated check mode to replace the original check mode. The specific algorithm for generating a random string is not limited by embodiments of the disclosure.

In step 403, the terminal stores the random string in a trusted storage area associated with the terminal user.

For example, the trusted storage area may include a TEE module or an SE module, and after the random string is generated, the terminal may store the random string in the trusted storage area.

In step 404, the terminal transmits the first original check credential information, the random string, and the user information of the terminal user to the server.

Consistent with the description in step 304, for example, the user information is the only information by which the terminal user may be uniquely identified. The user information may be a user name of the terminal user.

In step 405, the server searches for second original check credential information corresponding to the user information.

In step 406, the server determines whether the first original check credential information is consistent with the second original check credential information.

Description of steps 405 and 406 is consistent with that of steps 305 and 306, and details will be omitted herein.

In step 407, the server stores the correlation between the random string and the user information, when the first original check credential information is consistent with the second original check credential information.

When the first original check credential information is determined to be consistent with the second original check credential information according to a determining result, the server may determine that the object who is currently replacing a security check mode is the terminal user himself/herself. Accordingly, at this time, the server may store the correlation between the received random string and the user information.

In step 408, the terminal performs a local check according to the updated check mode to acquire a local check result when the terminal user performs a security check.

Description of step 408 is consistent with that of step 308, and details are omitted herein.

In step 409, the terminal encrypts, by a message abstract algorithm pre-negotiated with the server, the random string and the local check result stored in the trusted storage area, to acquire a first encrypted data result.

For example, the terminal and the server may pre-negotiate a message abstract algorithm, wherein the message abstract algorithm may be, for example, a Hash-based Message Authentication Code (HMAC). The HMAC may use a Hash algorithm, take a key and a message as inputs, and generate a message abstract as an output.

For example, after the local check result is acquired, the terminal may acquire the stored random string from the trusted storage area, take the random string as a key and the local check result as a message, and encrypt the random string and the local check result by an HMAC algorithm, so as to generate a first encrypted data result.

In step 410, the terminal sends the first encrypted data result, the local check result, and the user information of the terminal user to the server.

In step 411, the server acquires a random string corresponding to the received user information by searching for the stored correlation.

Referring to the above step 407, when the updated check mode is used to replace the local check mode, the server stores correlation between the random string and the user information. In this step, the server may search for the correlation after receiving the first encrypted data result, the local check result, and the user information of the terminal user, so as to acquire a random string corresponding to the received user information.

In step 412, the server encrypts the found random string and the local check result by an encryption abstract algorithm that is pre-negotiated with the terminal, so as to acquire a second encrypted data result.

In this step, corresponding to the process of locally encrypting the local check result and the random string by a message abstract algorithm at the terminal in step 409, the server may acquire a message abstract algorithm that is pre-negotiated with the terminal. The server can then encrypt the received local check result and the found random string by the message abstract algorithm, so as to acquire a second encrypted data result.

In step 413, the server determines whether the second encrypted data result is consistent with the first encrypted data result. And if the second encrypted data result is consistent with the first encrypted data result, the local check result may be determined to be trustable.

For example, when the second encrypted data result is determined to be consistent with the first encrypted data result, the server may determine that the local check result is trustable. Furthermore, the server may determine the accuracy of the check result. And if the check result is accurate, current service operations of the terminal user may be released, and if the check result is inaccurate, the terminal user is prohibited from executing the current service operations.

It may be seen from the above embodiments that, when the updated check mode is used to replace the original check mode, the terminal and the server store the random string generated for the updated check mode. Therefore, when the updated check mode is used for a check, the terminal may encrypt the random string and the local check result by a message abstract algorithm that is pre-negotiated. The corresponding server may encrypt, by the same message abstract algorithm, the random string and the local check result transmitted by the terminal, and determine that the local check result is trustable when the two encrypted data results are consistent with each other. By applying embodiments of the disclosure, a malicious third party cannot acquire the random string and the message abstract algorithm that is pre-negotiated by the terminal with the server, and the security check cannot be completed even if the malicious third party acquires the local check result. Thus, it may improve the reliability of the security check and secure the access of network applications.

Corresponding to the embodiments of the security check method of the disclosure, the disclosure further provides embodiments of a device, a terminal, and a server for a security check.

Figure 5:
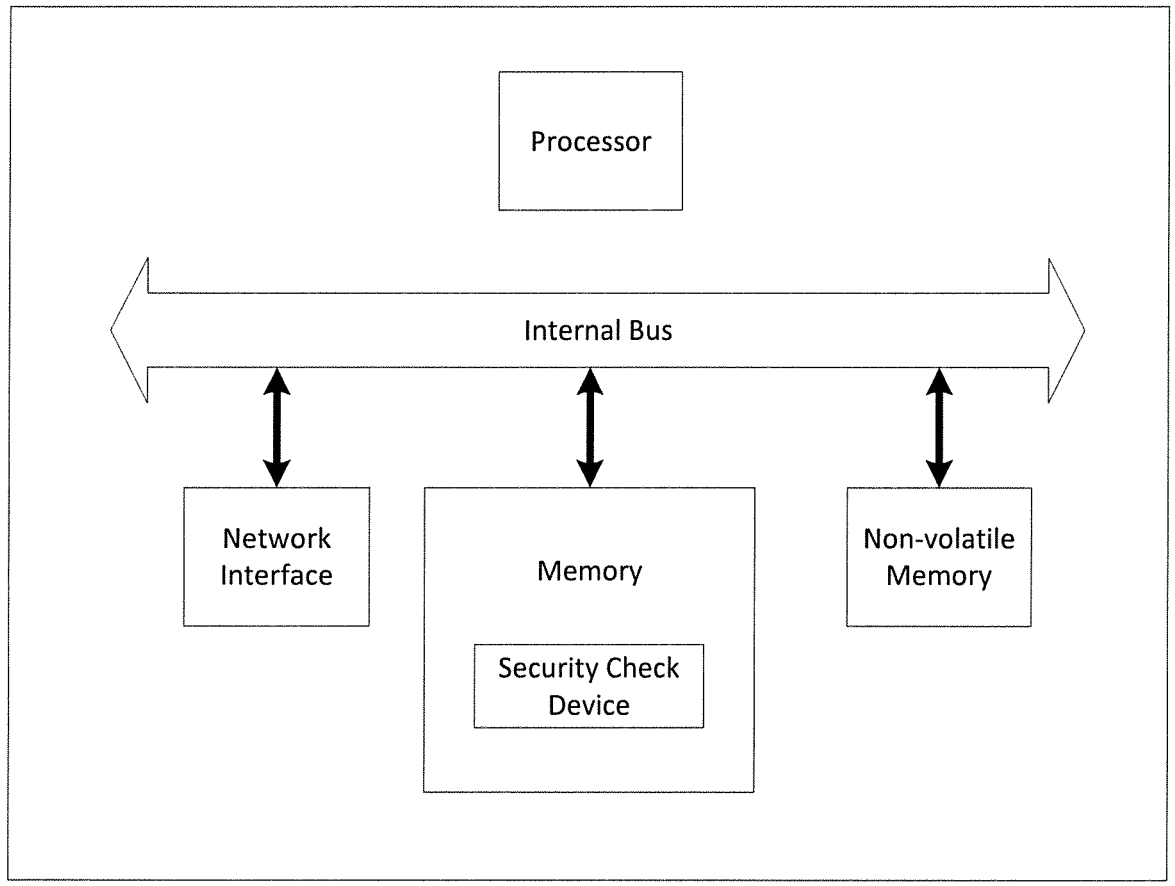
FIG. 5 is a hardware structural diagram of a device where a device for a security check is disposed according to embodiments of the disclosure.

The embodiments of the device for a security check of the disclosure may be applied to the terminal and the server, respectively. The embodiments of the device may be implemented via software, hardware or a combination thereof. For example, software implementation, as an device in a logical sense, is formed by a processor of an apparatus, where the device is located, reading a corresponding computer program instruction in a non-volatile memory to a memory for running. From the perspective of hardware, FIG. 5 is a hardware structural diagram of an apparatus where the security check device is located according to embodiments of the disclosure. Besides a processor, a memory, a network interface and a non-volatile memory as shown in FIG. 5, the apparatus where the device is located may generally further include other hardware according to the actual functions of the device. For example, the terminal may include a camera, a touch screen, a communications component, or the like. And the server may include a transceiver chip, which is responsible for processing packets.

Figure 6:
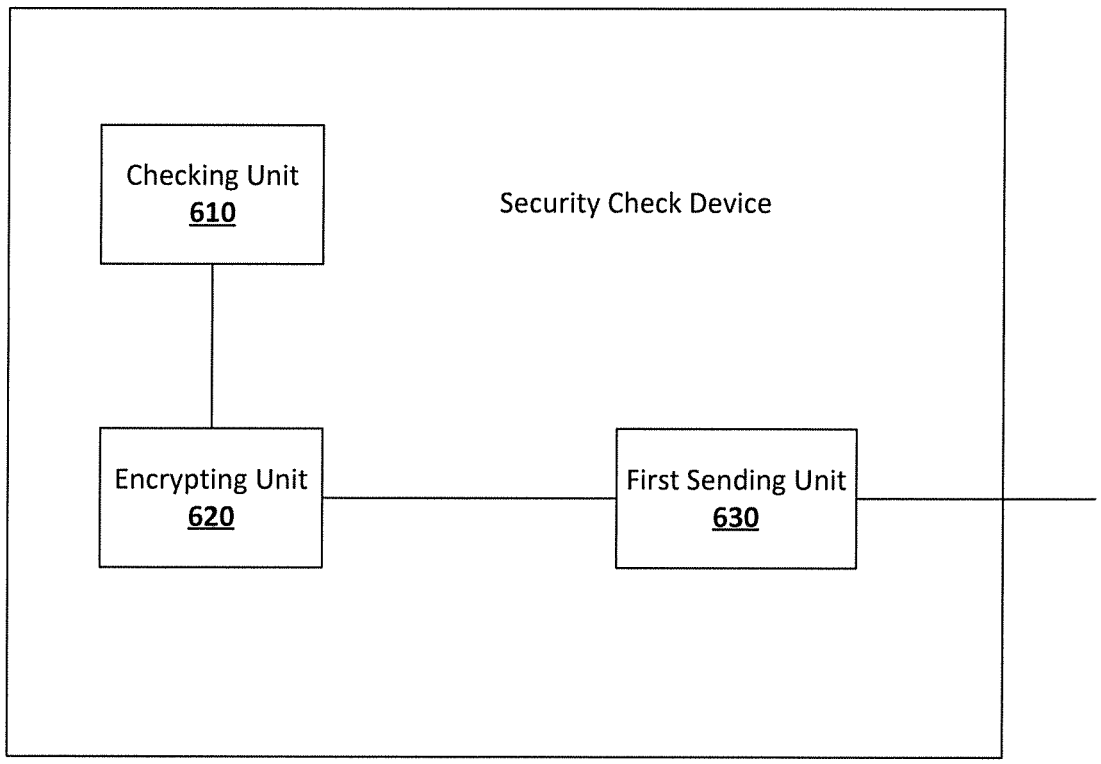
FIG. 6 is a block diagram of a device for a security check according to embodiments of the disclosure.

FIG. 6 is a block diagram of a security check device according to some embodiments of the disclosure. The security check device may be applied to a terminal. The device may include: a checking unit 610, an encrypting unit 620, and a first sending unit 630.

Checking unit 610 is used for performing a local check by an updated check mode to acquire a local check result when a terminal user performs a security check.

Encrypting unit 620 is used for encrypting the local check result according to stored substitutive credential information to acquire an encrypted check result, wherein the substitutive credential information is information that is generated when the updated check mode is used to replace an original check mode.

First sending unit 630 is used for sending the encrypted check result, the local check result, and user information of the terminal user to a server, so that the server determines the local check result to be trustable when the verification of the encrypted check result according to substitutive credential information corresponding to the user information is passed.

In general, these units (and subsequently mentioned units and sub-units) as used herein can be a packaged functional hardware unit designed for use with other components (e.g., portions of an integrated circuit) or a part of a program (stored on a computer readable medium) that performs a particular function of related functions. The unit can have entry and exit points and can be written in a programming language, such as, for example, Java, Lua, C or C++. A software unit can be compiled and linked into an executable program, installed in a dynamic link library, or written in an interpreted programming language such as, for example, BASIC, Perl, or Python. It will be appreciated that software units can be callable from other units or from themselves, and/or can be invoked in response to detected events or interrupts. Software units configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware units can be comprised of connected logic units, such as gates and flip-flops, and/or can be comprised of programmable units, such as programmable gate arrays or processors. The units or computing device functionality described herein are preferably implemented as software units, but can be represented in hardware or firmware. Generally, the units described herein refer to logical units that can be combined with other units or divided into sub-units despite their physical organization or storage.

Figure 7:
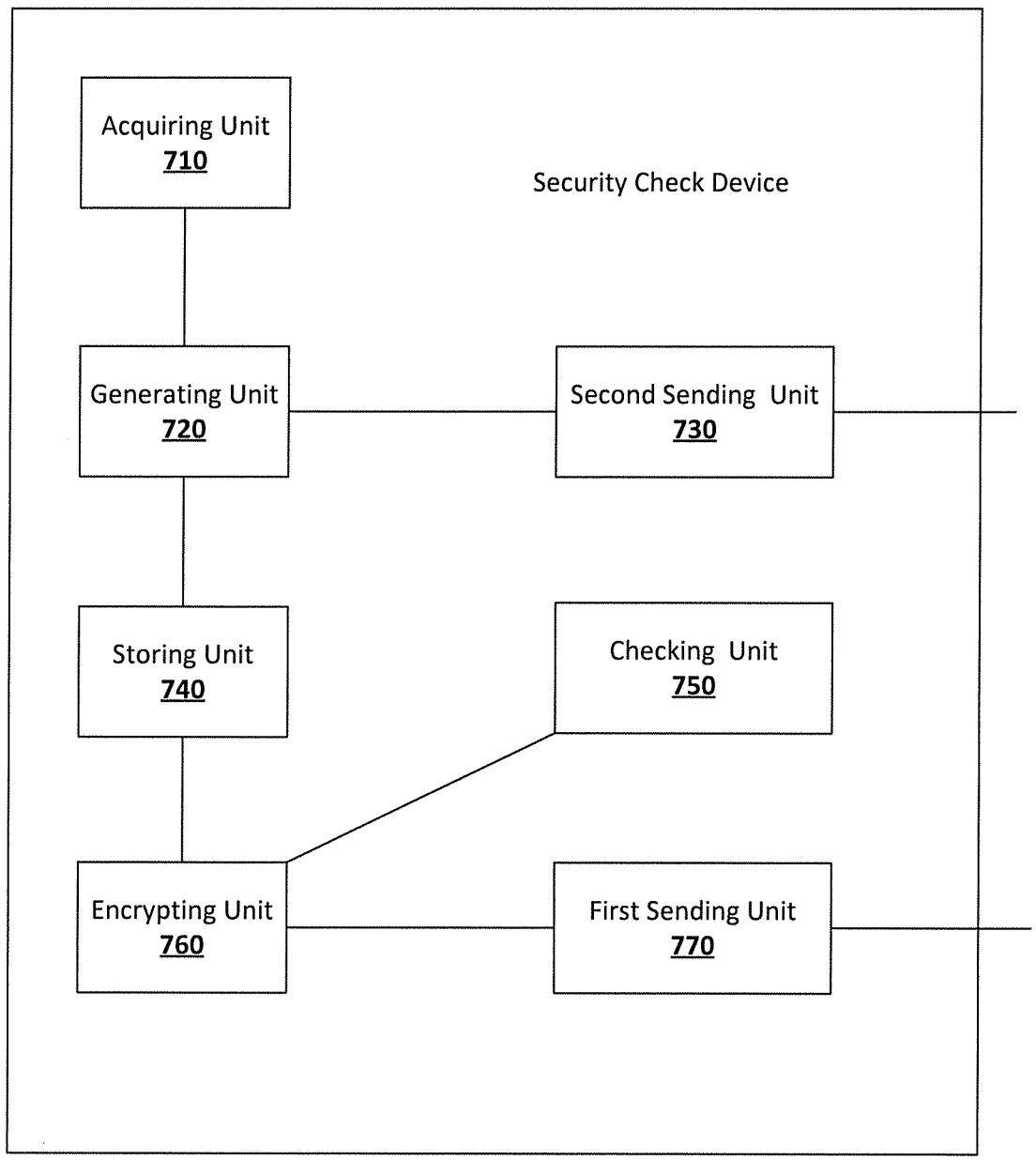
FIG. 7 is a block diagram of another device for a security check according to embodiments of the disclosure.

FIG. 7 is a block diagram of a security check device according to some embodiments of the disclosure. The security check device may be applied to a terminal, and the device includes: an acquiring unit 710, a generating unit 720, a second sending unit 730, a storing unit 740, a checking unit 750, an encrypting unit 760, and a first sending unit 770.

Acquiring unit 710 is used for acquiring first original check credential information of an original check mode when the updated check mode is used to replace the original check mode.

Generating unit 720 is used for generating the substitutive credential information for the updated check mode.

Second sending unit 730 is used for transmitting the first original check credential information, the substitutive credential information, and the user information to the server, which then retrieves second original check credential information corresponding to the user information. When the second original check credential information is consistent with the first original check credential information, the correlation between the substitutive credential information and the user information is stored.

Storing unit 740 is used for storing the substitutive credential information in a trusted storage area associated with the terminal user, wherein the trusted storage area comprises a TEE module or an SE module.

Checking unit 750 is used for performing a local check via an updated check mode to acquire a local check result when a terminal user performs a security check.

Encrypting unit 760 is used for encrypting the local check result according to stored substitutive credential information, so as to acquire an encrypted check result. The substitutive credential information is information that is generated when the updated check mode is used to replace an original check mode.

First sending unit 770 is used for sending the encrypted check result, the local check result, and user information of the terminal user to a server, so that the server determines the local check result to be trustable when the verification of the encrypted check result according to substitutive credential information corresponding to the user information is passed.

In an alternative implementation, the substitutive credential information may comprise: a public key and a private key. Second sending unit 730 may be specifically used for transmitting the public key to the server. Encrypting unit 760 may be specifically used for digitally signing the local check result according to the stored private key to acquire signature information. First sending unit 770 may be specifically used for sending the signature information to the server, so that the server determines the local check result to be trustable when the verification of the signature information according to the public key corresponding to the user information is passed.

In another alternative implementation, the substitutive credential information may comprise a random string. Second sending unit 730 may be specifically used for transmitting the random string to the server. Encrypting unit 760 may be specifically used for encrypting the random string and the local check result by a message abstract algorithm pre-negotiated with the server, to acquire a first encrypted data result. First sending unit 770 may be specifically used for sending the first encrypted data result to the server. The server acquires a random string corresponding to the user information, and encrypts the random string corresponding to the user information and the local check result by the message abstract algorithm, so as to acquire a second encrypted data result. And when the second encrypted data result is consistent with the first encrypted data result, the server determines that the local check result is trustable.

Figure 8:
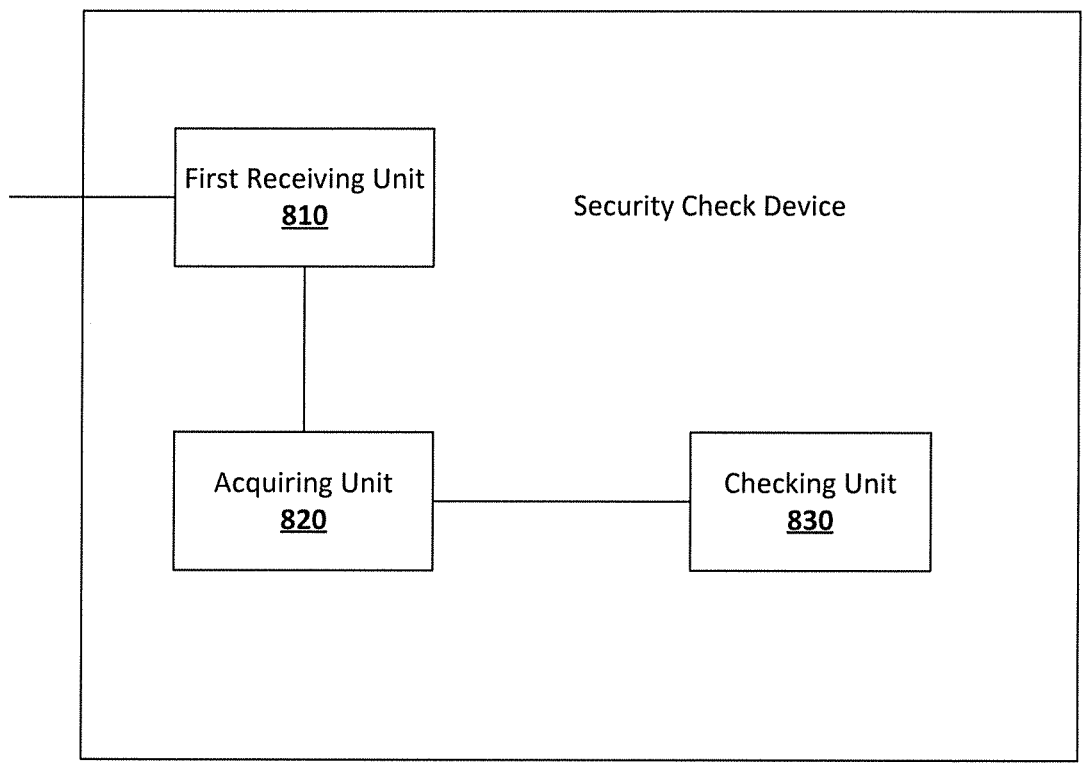
FIG. 8 is a block diagram of another device for a security check according to embodiments of the disclosure.

FIG. 8 is a block diagram of another embodiment of the security check device according to embodiments of the disclosure. The security check device may be applied to a server, and the device may include: a first receiving unit 810, an acquiring unit 820, and a checking unit 830.

First receiving unit 810 is used for receiving (from a terminal) an encrypted check result, a local check result, and user information corresponding to the user of the terminal. The encrypted check result is an encrypted check result that is generated when the terminal encrypts the local check result according to stored substitutive credential information, which is information that is generated when the terminal uses an updated check mode to replace an original check mode. The local check result is a check result that is acquired by the terminal performing a local check via the updated check mode when the terminal user performs a security check.

Acquiring unit 820 is used for acquiring substitutive credential information corresponding to the user information.

Checking unit 830 is used for verifying the encrypted check result according to the substitutive credential information corresponding to the user information, and determining the local check result is trustable when the verification is passed.

Figure 9:
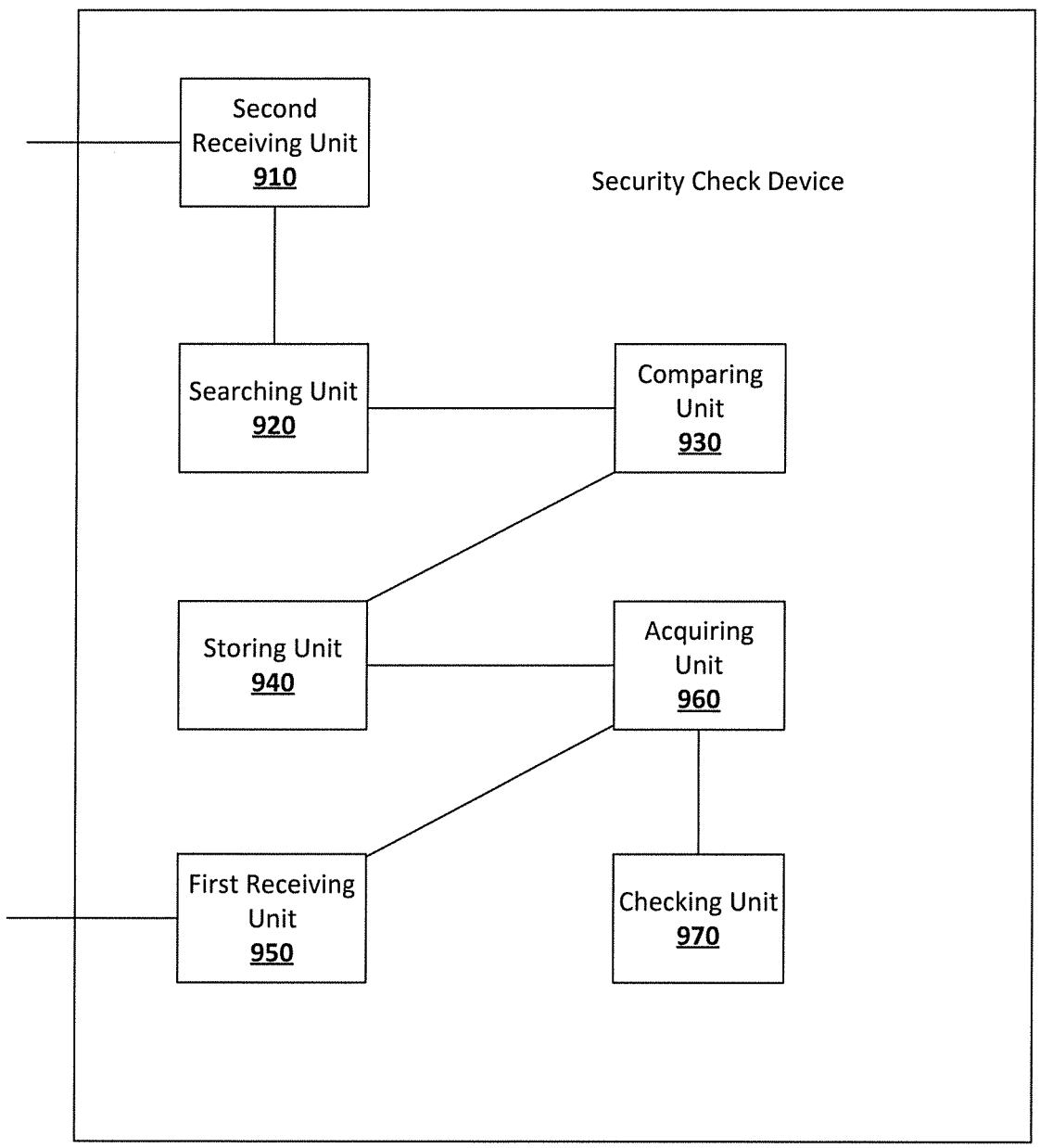
FIG. 9 is a block diagram of another device for a security check according to embodiments of the disclosure.

FIG. 9 is a block diagram of another security check device according to embodiments of the disclosure. The security check device may be applied to a server, and the device comprises: a second receiving unit 910, a searching unit 920, a comparing unit 930, a storing unit 940, a first receiving unit 950, an acquiring unit 960, and a checking unit 970.

Second receiving unit 910 is used for receiving first original check credential information, substitutive credential information, and the user information sent by the terminal when the terminal uses the updated check mode to replace an original check mode. The first original check credential information is check credential information of the original check mode. The substitutive credential information is substitutive credential information that is generated by the terminal for the updated check mode.

Searching unit 920 is used for searching for second original check credential information corresponding to the user information.

Comparing unit 930 is used for determining whether the first original check credential information is consistent with the second original check credential information.

Storing unit 940 is used for storing the correlation between the substitutive credential information and the user information when the first original check credential information is consistent with the second original check credential information.

First receiving unit 950 is used for receiving (from a terminal) an encrypted check result, a local check result, and user information corresponding to the user of the terminal. The encrypted check result is an encrypted check result that is generated when the terminal encrypts the local check result according to stored substitutive credential information, which is information that is generated when the terminal uses an updated check mode to replace an original check mode. The local check result is a check result that is acquired by the terminal performing a local check via the updated check mode when the terminal user performs a security check.

Acquiring unit 960 is used for acquiring substitutive credential information corresponding to the user information.

Checking unit 970 is used for verifying the encrypted check result according to the substitutive credential information corresponding to the user information, and determining that the local check result is trustable when the verification is passed.

In an alternative implementation, the substitutive credential information may comprise a public key and a private key. Second receiving unit 910 may be specifically used for receiving the public key sent by the terminal. First receiving unit 950 may be specifically used for receiving signature information sent by the terminal, wherein the signature information is signature information that is acquired by the terminal digitally signing the local check result according to the stored private key. Acquiring unit 960 may be specifically used for acquiring a public key corresponding to the user information by searching for the correlation. And checking unit 970 may be specifically used for verifying the signature information via the public key corresponding to the user information.

In another alternative implementation, the substitutive credential information comprises a random string. Second receiving unit 910 may be specifically used for receiving the random string sent by the terminal. First receiving unit 950 may be specifically used for receiving a first encrypted data result sent by the terminal, wherein the first encrypted data result is an encrypted data result that is acquired by the terminal encrypting the random string and the local check result by a message abstract algorithm pre-negotiated with the server. Acquiring unit 960 may be specifically used for acquiring a random string corresponding to the user information by searching for the correlation.

Checking unit 970 may comprise (not shown in FIG. 9): a result encrypting sub-unit and a result determining sub-unit. The result encrypting sub-unit can be used for encrypting a random string corresponding to the user information and the local check result by the encryption abstract algorithm, so as to acquire a second encrypted data result. The result determining sub-unit can be used for determining whether the second encrypted data result is consistent with the first encrypted data result. If the result determining sub-unit determines that the second encrypted data result is consistent with the first encrypted data result, then the verification has passed.

For an implementation process of functions and effects of the units of the above device, please refer to a corresponding step implementation process in the foregoing method, and details are omitted herein.

As to the device embodiments, because they substantially correspond to the method embodiments, reference may be made to related parts of the method embodiments. The device embodiments described above are merely illustrative, in which units that are described as separated parts may or may not be physically separated from each other, and those parts shown as units may or may not be physical units, which may be positioned at one location or may also be distributed over multiple network units. Some or all of the modules may be selected according to practical requirements to achieve the objectives of the solutions of the disclosure. Those of ordinary skill in the art may understand and implement the solutions without involving inventive efforts.

It may be seen from the above embodiment that when the updated check mode is used to replace the original check mode, both the terminal and the server store the substitutive credential information generated for the updated check mode. Therefore, when the updated check mode is used for a check, the local check result may be encrypted via the substitutive credential information. And the corresponding server may verify, via the substitutive credential information, the encrypted check result that has been encrypted and is transmitted by the terminal. When the verification passes, the server then determines that the local check result is trustworthy. In the application of the embodiments of the disclosure, a malicious third party cannot acquire the substitutive credential information, and the security check cannot be completed even if the malicious third party acquires the local check result. Therefore the embodiments of the disclosure may improve the reliability of the security check and ensure the access security of network applications.

Another aspect of the disclosure is directed to a non-transitory computer-readable medium storing instructions which, when executed, cause one or more processors to perform the methods, as discussed above. The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 410. Volatile media can include dynamic memory, such as main memory 406. Non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics. Transmission media can also take the form of acoustic or light waves, such as those generated during radio-wave and infra-red data communications.

Those skilled in the art would readily conceive of other implementations of the present invention after taking the specification into consideration and making practice of the invention. The disclosure is intended to cover any variants, usages or adaptive variations of the present invention, and these variants, usages or adaptive variations follow the general principles of the present invention and comprise common knowledge or customary technical means in the art which are not disclosed in the disclosure. The specification and embodiments are merely deemed as illustrative, and the true scope and spirit of the disclosure are pointed out by the claims below.

It should be understood that the disclosure is not limited to the precise structures which have been described and shown in the drawings above, and various modifications and changes may be made without departing from the scope thereof. The scope of the disclosure is only limited by the appended claims.

What is claimed is:

1. A method for a security check, comprising:
    replacing an original check mode with an updated check mode, wherein the original check mode is performed at a server side using a first original check credential information;
    performing a local check via the updated check mode to acquire a local check result, when a terminal user performs the security check;
    encrypting the local check result according to stored substitutive credential information to acquire an encrypted check result, wherein the substitutive credential information is generated according to the first original check credential information when the updated check mode is used to replace the original check mode and the updated check mode comprises a check algorithm that is different from the original check mode; and
    sending the encrypted check result, the local check result, and user information of the terminal user to a server, wherein
    the local check result is determined to be trustable when verification of the encrypted check result according to substitutive credential information corresponding to the user information is passed.

2. The method according to claim 1, further comprising:
    acquiring first original check credential information of the original check mode when the updated check mode is used to replace the original check mode;
    generating the substitutive credential information for the updated check mode; and
    transmitting the first original check credential information, the substitutive credential information, and the user information to the server, so that second original check credential information corresponding to the user information is retrieved, and correlation between the substitutive credential information and the user information is stored when the second original check credential information is consistent with the first original check credential information.

3. The method according to claim 2, further comprising:
    storing the substitutive credential information in a trusted storage area associated with the terminal user, wherein the trusted storage area comprises a trusted execution environment (TEE) module or a security environment (SE) module.

4. The method according to claim 2, wherein the substitutive credential information comprises a public key and a private key;
    transmitting the substitutive credential information to the server further comprises transmitting the public key to the server;
    encrypting the local check result according to stored substitutive credential information to acquire an encrypted check result further comprises digitally signing the local check result according to the stored private key to acquire signature information; and
    sending the encrypted check result to the server further comprises sending the signature information to the server, wherein
    the local check result is determined to be trustable when verification of the signature information according to the public key corresponding to the user information is passed.

5. The method according to claim 2, wherein the substitutive credential information comprises a random string;
    transmitting the substitutive credential information to the server further comprises transmitting the random string to the server;
    encrypting the local check result according to stored substitutive credential information to acquire an encrypted check result further comprises encrypting the random string and the local check result by a message abstract algorithm, so as to acquire a first encrypted data result; and
    sending the encrypted check result to the server further comprises sending the first encrypted data result to the server to acquire a second encrypted data result, wherein
    the local check result is determined to be trustable when the second encrypted data result is consistent with the first encrypted data result.

6. A security check method, comprising:
    receiving an encrypted check result, a local check result, and user information of a terminal user that are sent by a terminal, wherein the encrypted check result is generated by encrypting the local check result according to stored substitutive credential information, the substitutive credential information is generated according to a first original check credential information when an updated check mode replaces an original check mode, and the local check result is acquired by performing a local check via the updated check mode when the terminal user performs a security check, wherein the original check mode is performed using the first original check credential information and the updated check mode comprises a check algorithm that is different from the original check mode's check algorithm;
    acquiring substitutive credential information corresponding to the user information; and
    verifying the encrypted check result according to the substitutive credential information corresponding to the user information, and determining the local check result to be trustable when the verification is passed.

7. The method according to claim 6, further comprising:
    receiving first original check credential information, substitutive credential information, and the user information sent by the terminal when the terminal uses the updated check mode to replace an original check mode, wherein the first original check credential information is check credential information of the original check mode, and the substitutive credential information is generated by the terminal for the updated check mode;
    searching for second original check credential information corresponding to the user information;
    determining whether the first original check credential information is consistent with the second original check credential information; and
    storing correlation between the substitutive credential information and the user information when the first original check credential information is consistent with the second original check credential information.

8. The method according to claim 7, wherein the substitutive credential information comprises a public key and a private key;
receiving substitutive credential information sent by the terminal further comprises receiving the public key sent by the terminal;
receiving an encrypted check result sent by the terminal further comprises receiving signature information sent by the terminal, wherein the signature information is acquired by digitally signing the local check result according to the stored private key;
acquiring substitutive credential information corresponding to the user information further comprises acquiring a public key corresponding to the user information by searching for the correlation; and
verifying the encrypted check result according to the substitutive credential information corresponding to the user information further comprises verifying the signature information via the public key corresponding to the user information.

9. The method according to claim 7, wherein the substitutive credential information comprises a random string;
receiving substitutive credential information sent by the terminal further comprises receiving the random string sent by the terminal;
receiving an encrypted check result sent by the terminal further comprises receiving a first encrypted data result sent by the terminal, wherein the first encrypted data result is acquired by encrypting the random string and the local check result by a message abstract algorithm;
acquiring substitutive credential information corresponding to the user information further comprises acquiring a random string corresponding to the user information by searching for the correlation; and
verifying the encrypted check result according to the substitutive credential information corresponding to the user information comprises: encrypting, by the encryption abstract algorithm, a random string corresponding to the user information and the local check result, so as to acquire a second encrypted data result; and determining whether the second encrypted data result is consistent with the first encrypted data result, wherein upon the second encrypted data result being consistent with the first encrypted data result, the verifying is passed.

10. A terminal, comprising:
a processor; and a memory for storing instructions executable by the processor;
wherein the processor is configured to cause the terminal to:
replace an original check mode with an updated check mode, wherein the original check mode is performed at a server side using a first original check credential information;
perform a local check via an updated check mode to acquire a local check result, when a terminal user performs the security check;
encrypt the local check result according to stored substitutive credential information to acquire an encrypted check result, wherein the substitutive credential information is generated according to the first original check credential information when the updated check mode is used to replace the original check mode, and the updated check mode comprises a check algorithm that is different from the original check mode's check algorithm; and
send the encrypted check result, the local check result and user information of the terminal user to a server, wherein
the local check result is determined to be trustable when the verification of the encrypted check result according to substitutive credential information corresponding to the user information is passed.

11. A server, comprising:
a processor; and a memory for storing instructions executable by the processor;
wherein the processor is configured to cause the server to:
receive an encrypted check result, a local check result, and user information of a terminal user that are sent by a terminal, wherein the encrypted check result is generated by encrypting the local check result according to stored substitutive credential information, the substitutive credential information is generated according to a first original check credential information when an updated check mode replaces an original check mode, and the local check result is acquired by performing a local check via the updated check mode when the terminal user performs a security check, wherein the original check mode is performed using the first original check credential information and the updated check mode comprises a check algorithm that is different from the original check mode's check algorithm;
acquire substitutive credential information corresponding to the user information; and
verify the encrypted check result according to the substitutive credential information corresponding to the user information, and determine the local check result to be trustable when the verification is passed.

12. The terminal according to claim 10, wherein the processor is further configured to cause the terminal to:
acquire first original check credential information of the original check mode when the updated check mode is used to replace the original check mode;
generate the substitutive credential information for the updated check mode; and
transmit the first original check credential information, the substitutive credential information, and the user information to the server, so that second original check credential information corresponding to the user information is retrieved, and the correlation between the substitutive credential information and the user information is stored, when the second original check credential information is consistent with the first original check credential information.

13. The terminal according to claim 12, wherein the substitutive credential information is stored in a TEE module or an SE module.

14. The server according to claim 11, wherein the processor is further configured to cause the server to:
receive first original check credential information, substitutive credential information, and the user information sent by the terminal when the terminal uses the updated check mode to replace an original check mode, wherein the first original check credential information is check credential information of the original check mode, and the substitutive credential information is generated by the terminal for the updated check mode;
search for second original check credential information corresponding to the user information;

compare whether the first original check credential information is consistent with the second original check credential information; and store correlation between the substitutive credential information and the user information when the first original check credential information is consistent with the second original check credential information.

15. A non-transitory computer readable medium that stores a set of instructions that is executable by at least one processor of a terminal device to cause the terminal device to perform a security check method, the method comprising:

replacing an original check mode with an updated check mode, wherein the original check mode is performed at a server side using a first original check credential information;

performing a local check via an updated check mode to acquire a local check result, when a terminal user performs the security check;

encrypting the local check result according to stored substitutive credential information to acquire an encrypted check result, wherein the substitutive credential information is generated according to the first original check credential information when the updated check mode is used to replace the original check mode and the updated check mode comprises a check algorithm that is different from the original check mode's check algorithm; and sending the encrypted check result, the local check result and user information of the terminal user to a server, wherein the local check result is determined to be trustable when the verification of the encrypted check result according to substitutive credential information corresponding to the user information is passed.

16. The non-transitory computer readable medium according to claim 15, wherein the set of instructions is executable by the at least one processor of the terminal device to cause the terminal device to perform:

acquiring first original check credential information of the original check mode when the updated check mode is used to replace the original check mode;

generating the substitutive credential information for the updated check mode; and transmitting the first original check credential information, the substitutive credential information, and the user information to the server, so that second original check credential information corresponding to the user information is retrieved, and correlation between the substitutive credential information and the user information is stored when the second original check credential information is consistent with the first original check credential information.

17. The non-transitory computer readable medium according to claim 16, wherein the set of instructions is executable by the at least one processor of the terminal device to cause the terminal device to perform:

storing the substitutive credential information in a trusted storage area associated with the terminal user, wherein the trusted storage area comprises a trusted execution environment (TEE) module or a security environment (SE) module.

18. The non-transitory computer readable medium according to claim 16, wherein the substitutive credential information comprises a public key and a private key;

the set of instructions is executable by the at least one processor of the terminal device to cause the terminal device to perform transmitting the substitutive credential information to the server by transmitting the public key to the server;

the set of instructions is executable by the at least one processor of the terminal device to cause the terminal device to perform encrypting the local check result according to stored substitutive credential information to acquire an encrypted check result by digitally signing the local check result according to the stored private key to acquire signature information; and the set of instructions is executable by the at least one processor of the terminal device to cause the terminal device to perform sending the encrypted check result to the server by sending the signature information to the server, wherein the local check result is determined to be trustable when verification of the signature information according to the public key corresponding to the user information is passed.

19. The non-transitory computer readable medium according to claim 16, wherein the substitutive credential information comprises a random string;

the set of instructions is executable by the at least one processor of the terminal device to cause the terminal device to perform transmitting the substitutive credential information to the server by transmitting the random string to the server;

the set of instructions is executable by the at least one processor of the terminal device to cause the terminal device to perform encrypting the local check result according to stored substitutive credential information to acquire an encrypted check result by encrypting the random string and the local check result by a message abstract algorithm, so as to acquire a first encrypted data result; and the set of instructions is executable by the at least one processor of the terminal device to cause the terminal device to perform sending the encrypted check result to the server by sending the first encrypted data result to the server to acquire a second encrypted data result, wherein the local check result is determined to be trustable when the second encrypted data result is consistent with the first encrypted data result.

20. A non-transitory computer readable medium that stores a set of instructions that is executable by at least one processor of a server to cause the server to perform a security check method, the method comprising:

receiving an encrypted check result, a local check result, and user information of a terminal user that are sent by a terminal, wherein the encrypted check result is generated by encrypting the local check result according to stored substitutive credential information, the substitutive credential information is generated according to a first original check credential information when an updated check mode replaces an original check mode, and the local check result is acquired by performing a local check via the updated check mode when the terminal user performs a security check, wherein the original check mode is performed using the first original check credential information and the updated check mode comprises a check algorithm that is different from the original check mode's check algorithm;

acquiring substitutive credential information corresponding to the user information; and verifying the encrypted check result according to the substitutive credential information corresponding to the user information, and determining the local check result to be trustable when the verification is passed.

21. The non-transitory computer readable medium according to claim 20, the set of instructions is executable by the at least one processor of the server to cause the server to perform:
    receiving first original check credential information, substitutive credential information, and the user information sent by the terminal when the terminal uses the updated check mode to replace an original check mode, wherein the first original check credential information is check credential information of the original check mode, and the substitutive credential information is generated by the terminal for the updated check mode;
    searching for second original check credential information corresponding to the user information;
    determining whether the first original check credential information is consistent with the second original check credential information; and
    storing correlation between the substitutive credential information and the user information when the first original check credential information is consistent with the second original check credential information.

22. The non-transitory computer readable medium according to claim 21, wherein the substitutive credential information comprises a public key and a private key;
    the set of instructions is executable by the at least one processor of the server to cause the server to perform receiving substitutive credential information sent by the terminal by receiving the public key sent by the terminal;
    the set of instructions is executable by the at least one processor of the server to cause the server to perform receiving an encrypted check result sent by the terminal by receiving signature information sent by the terminal, wherein the signature information is acquired by digitally signing the local check result according to the stored private key;
    the set of instructions is executable by the at least one processor of the server to cause the server to perform acquiring substitutive credential information corresponding to the user information by acquiring a public key corresponding to the user information by searching for the correlation; and
    the set of instructions is executable by the at least one processor of the server to cause the server to perform verifying the encrypted check result according to the substitutive credential information corresponding to the user information by verifying the signature information via the public key corresponding to the user information.

23. The non-transitory computer readable medium according to claim 21, wherein the substitutive credential information comprises a random string;
    the set of instructions is executable by the at least one processor of the server to cause the server to perform receiving substitutive credential information sent by the terminal by receiving the random string sent by the terminal;
    the set of instructions is executable by the at least one processor of the server to cause the server to perform receiving an encrypted check result sent by the terminal by receiving a first encrypted data result sent by the terminal, wherein the first encrypted data result is acquired by encrypting the random string and the local check result by a message abstract algorithm;
    acquiring substitutive credential information corresponding to the user information further comprises acquiring a random string corresponding to the user information by searching for the correlation; and
    verifying the encrypted check result according to the substitutive credential information corresponding to the user information comprises: encrypting, by the encryption abstract algorithm, a random string corresponding to the user information and the local check result, so as to acquire a second encrypted data result; and determining whether the second encrypted data result is consistent with the first encrypted data result, wherein upon the second encrypted data result being consistent with the first encrypted data result, the verifying is passed.

* * * * *

UNITED STATES PATENT AND TRADEMARK OFFICE
CERTIFICATE OF CORRECTION

PATENT NO. : 10,721,076 B2
APPLICATION NO. : 15/484061
DATED : July 21, 2020
INVENTOR(S) : Junsui Lin Page 1 of 1

It is certified that error appears in the above-identified patent and that said Letters Patent is hereby corrected as shown below:

On the Title Page

Item (30) Foreign Application Priority Data, "2014 1 0532781" should read --201410532781.9--.

Signed and Sealed this
Thirteenth Day of February, 2024

Katherine Kelly Vidal
Director of the United States Patent and Trademark Office